United States Patent
Cho et al.

(10) Patent No.: US 11,245,129 B2
(45) Date of Patent: *Feb. 8, 2022

(54) ELECTRODE ASSEMBLY

(71) Applicant: Samsung SDI Co., Ltd., Yongin-si (KR)

(72) Inventors: Seongbong Cho, Yongin-si (KR); Jinpil Kim, Yongin-si (KR); Hyeonggu Roh, Yongin-si (KR); Kwanseop Song, Yongin-si (KR); Hyungnoh Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 185 days.

This patent is subject to a terminal disclaimer.

(21) Appl. No.: 16/222,889

(22) Filed: Dec. 17, 2018

(65) Prior Publication Data
US 2019/0189976 A1   Jun. 20, 2019

(30) Foreign Application Priority Data
Dec. 18, 2017  (KR) ........................ 10-2017-0174379

(51) Int. Cl.
*H01M 10/04* (2006.01)
*H01M 50/20* (2021.01)
(Continued)

(52) U.S. Cl.
CPC ..... *H01M 10/0459* (2013.01); *H01M 10/049* (2013.01); *H01M 50/112* (2021.01);
(Continued)

(58) Field of Classification Search
CPC ........... H01M 10/0459; H01M 10/049; H01M 10/0525; H01M 2/1016; H01M 2/24;
(Continued)

(56) References Cited

U.S. PATENT DOCUMENTS 3,558,358 A   1/1971 Ropp, Jr.
4,668,320 A   5/1987 Crabtree
(Continued)

FOREIGN PATENT DOCUMENTS

CN   1363121 A   8/2002
CN   101529641 A   9/2009
(Continued)

OTHER PUBLICATIONS

Extended European Search Report for corresponding European Patent Application No. 17171956.0, dated Oct. 6, 2017, 7 pages.
(Continued)

*Primary Examiner* — Eugenia Wang
(74) *Attorney, Agent, or Firm* — Lewis Roca Rothgerber Christie LLP

(57) ABSTRACT

An electrode assembly includes a first sub-unit body including a plurality of stacked first unit bodies, and a second sub-unit body at a lower portion of the first sub-unit body and including a plurality of stacked first unit bodies and a second unit body at a lower portion of the first unit bodies, and each of the first unit bodies includes: first and second electrode plates of a first electrode separately arranged at a side of a first separator; a second separator on the first and second electrode plates of the first electrode; a first electrode plate of a second electrode arranged to correspond to the first electrode plate of the first electrode, with the first separator therebetween; and a second electrode plate of the second electrode arranged to correspond to the second electrode plate of the first electrode, with the second separator therebetween.

6 Claims, 16 Drawing Sheets

(51) Int. Cl.
*H01M 50/112* (2021.01)
*H01M 50/103* (2021.01)
*H01M 50/209* (2021.01)
*H01M 50/46* (2021.01)
*H01M 50/502* (2021.01)
*H01M 50/529* (2021.01)
*H01M 10/0525* (2010.01)
*H01M 50/258* (2021.01)

(52) U.S. Cl.
CPC ........... *H01M 50/20* (2021.01); *H01M 50/46* (2021.01); *H01M 50/502* (2021.01); *H01M 50/529* (2021.01); *H01M 10/0525* (2013.01); *H01M 50/103* (2021.01); *H01M 50/209* (2021.01); *H01M 50/258* (2021.01)

(58) Field of Classification Search
CPC .. H01M 2/0242; H01M 2/0207; H01M 2/202; H01M 2/0245; H01M 2/0217
See application file for complete search history.

(56) References Cited

U.S. PATENT DOCUMENTS

| | | | |
|---|---|---|---|
| 8,119,274 | B2 | 2/2012 | Park et al. |
| 10,593,986 | B2 * | 3/2020 | Cho ................. H01M 10/0431 |
| 2002/0160257 | A1 | 10/2002 | Lee et al. |
| 2010/0099023 | A1 | 4/2010 | Kuroda et al. |
| 2014/0050958 | A1 | 2/2014 | Kwon et al. |
| 2016/0006072 | A1 * | 1/2016 | Cho ................. H01M 10/0404 |
| | | | 429/138 |
| 2016/0240883 | A1 | 8/2016 | Kim et al. |
| 2016/0248058 | A1 * | 8/2016 | Miki ................. H01M 2/0245 |
| 2016/0293994 | A1 | 10/2016 | Choi et al. |
| 2017/0338509 | A1 | 11/2017 | Cho et al. |

FOREIGN PATENT DOCUMENTS

| | | | | |
|---|---|---|---|---|
| CN | 104011929 | A | | 8/2014 |
| CN | 105375055 | A | | 3/2016 |
| CN | 105637672 | A | | 6/2016 |
| CN | 107181005 | A | | 9/2017 |
| CN | 107403897 | A | | 11/2017 |
| EP | 3246979 | A1 * | 11/2017 | ........ H01M 10/0431 |
| JP | 56-134476 | A | | 10/1981 |
| JP | 2003-344020 | A | | 12/2003 |
| JP | 2013-247031 | A | | 12/2013 |
| KR | 2001-0082059 | A | | 8/2001 |
| KR | 10-2007-0118715 | A | | 12/2007 |
| KR | 10-2008-0074239 | A | | 8/2008 |
| KR | 10-2013-0124098 | A | | 11/2013 |
| KR | 10-2014-0128512 | A | | 11/2014 |
| KR | 10-2016-0019284 | A | | 2/2016 |
| KR | 10-2017-0130855 | A | | 11/2017 |

OTHER PUBLICATIONS

Office Action issued in U.S. Appl. No. 15/599,370 by the USPTO, dated Jun. 7, 2019, 11 pages.

Chinese First Office action dated Aug. 2, 2021 issued in Chinese Application No. 201811548015.6, and Search Report dated Jul. 16, 2021, with English translation, 26 pages.

* cited by examiner

ELECTRODE ASSEMBLY

CROSS-REFERENCE TO RELATED APPLICATION

This application claims priority to and benefit of Korean Patent Application No. 10-2017-0174379, filed on Dec. 18, 2017 in the Korean Intellectual Property Office, the entire content of which is incorporated herein by reference.

BACKGROUND

1. Field

Aspects of embodiments of the present disclosure relate to an electrode assembly.

2. Description of the Related Art

In general, a rechargeable battery includes an electrode assembly including a positive electrode, a negative electrode, and a separator interposed therebetween, and a case accommodating the electrode assembly.

In recent years, research has been actively conducted to use such a rechargeable battery as a driving power supply or a power-storage power supply for devices requiring high energy density.

To this end, the electrode assembly of the rechargeable battery may be configured to include a plurality of unit cells. That is, an electrode assembly including a plurality of unit cells may be formed by connecting electrode tabs of each unit cell depending on a required capacity, thereby realizing a rechargeable battery having a high power.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present disclosure, an electrode assembly is provided in which an inferiority rate may be easily managed even when the electrode assembly is configured to stack a plurality of unit bodies for realizing a high capacity of a secondary battery.

According to one or more exemplary embodiments of the present invention: an electrode assembly includes a first sub-unit body including a plurality of stacked first unit bodies, and a second sub-unit body at a lower portion of first sub-unit body and including a plurality of stacked first unit bodies and a second unit body at a lower portion of the first unit bodies, wherein each of the first unit bodies includes first and second electrode plates of a first electrode separately arranged at a side of a first separator, a second separator on the first and second electrode plates of the first electrode, a first electrode plate of a second electrode arranged to correspond to the first electrode plate of the first electrode, with the first separator therebetween, and a second electrode plate of the second electrode arranged to correspond to the second electrode plate of the first electrode, with the second separator therebetween, and the first separator and the second separator are folded with respect to a folding line located between the first electrode plate and the second electrode plate of the first electrode. The second unit body may be configured as the first unit body from which the second electrode plate of the second electrode is removed, and which is folded.

According to one or more exemplary embodiments of the present invention, an electrode assembly includes a sub-unit body including a plurality of stacked first unit bodies and a second unit body at a lower portion of the first unit bodies, wherein the sub-unit body includes at least two sub-unit bodies stacked in a thickness direction through a connecting electrode, wherein each of the first unit bodies includes: first and second electrode plates of a first electrode separately arranged at a side of a first separator; a second separator on the first and second electrode plates of the first electrode, a first electrode plate of a second electrode arranged to correspond to the first electrode plate of the first electrode, with the first separator therebetween, and a second electrode plate of the second electrode arranged to correspond to the second electrode plate of the first electrode, with the second separator therebetween, and the first separator and the second separator are folded with respect to a folding line located between the first electrode plate and the second electrode plate of the first electrode. The second unit body may be configured as the first unit body from which the second electrode plate of the second electrode is removed, and which is folded.

According to exemplary embodiments of the present disclosure, the electrode assembly is configured to include a sub-unit body including a plurality of unit bodies stacked therein, and the electrode assembly is capable of implementing high capacity and ease of replacement even when some of the stacked unit bodies are defective.

DESCRIPTION OF SYMBOLS

Figure 1:
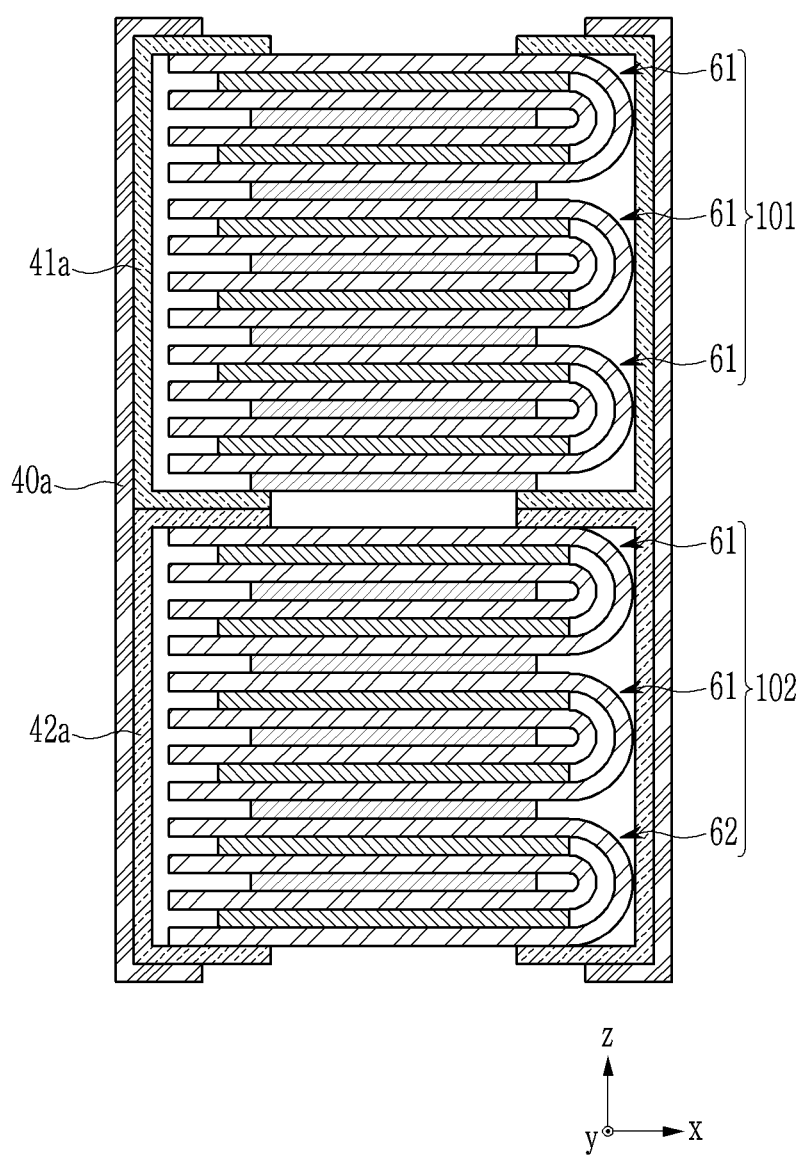
FIG. 1 illustrates a cross-section of an electrode assembly according to an exemplary embodiment.

61: first unit body
62: second unit body
101: first sub-unit body
102: second sub-unit body
200: electrode assembly
10: first electrode
20: second electrode
30: separator

DETAILED DESCRIPTION

The present invention will be described more fully herein with reference to the accompanying drawings, in which some exemplary embodiments of the invention are shown. As those skilled in the art would realize, the described embodiments may be modified in various different ways, all without departing from the spirit or scope of the present invention.

To clearly describe the present invention, parts that are irrelevant to the description may be omitted, and like numerals refer to like or similar constituent elements throughout the specification.

Further, since sizes and thicknesses of constituent members shown in the accompanying drawings may be arbitrarily shown for better understanding and ease of description, the present invention is not limited to the illustrated sizes and thicknesses.

It is to be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It is to be understood that when an element or layer is referred to as being "on," "connected to," or "coupled to" another element or layer, it can be directly on, connected to, or coupled to the other element or layer, or one or more intervening elements or layers may be present. In addition, it is also to be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It is to be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 exemplarily illustrates a cross-section of an electrode assembly according to an exemplary embodiment.

Referring to FIG. 1, an electrode assembly 200 according to an exemplary embodiment includes a first sub-unit body 101 and a second sub-unit body 102.

The first sub-unit body 101 includes a plurality of first unit bodies 61 that are stacked in a thickness direction.

The second sub-unit body 102 includes a plurality of first unit bodies 61 that are stacked in the thickness direction and a second unit body 62 disposed below the first unit bodies 61.

Figure 2:
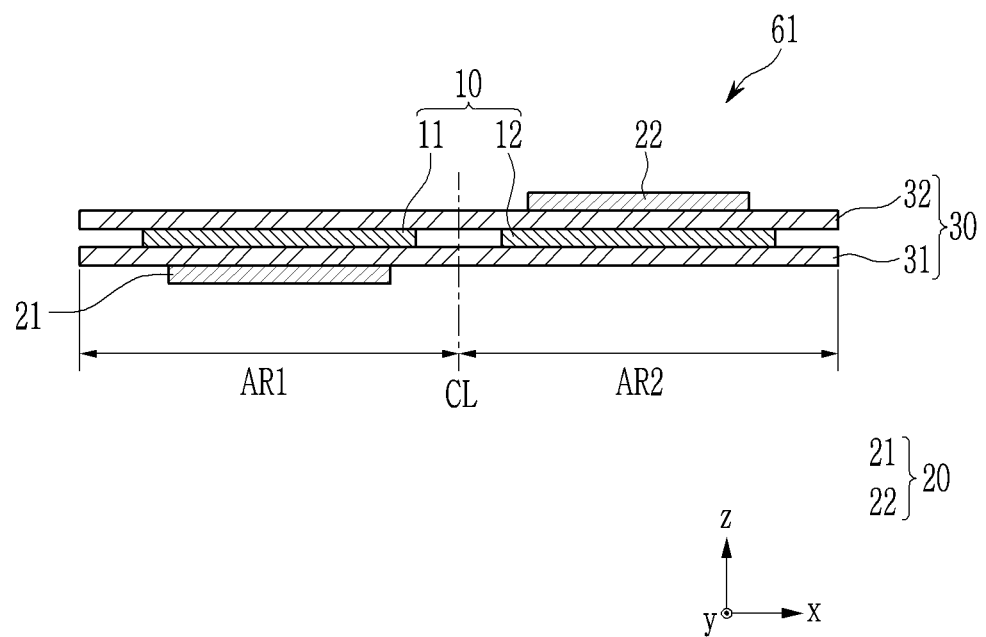
FIG. 2 is a cross-sectional view illustrating a stacked state before a first unit body is folded.
Figure 3:
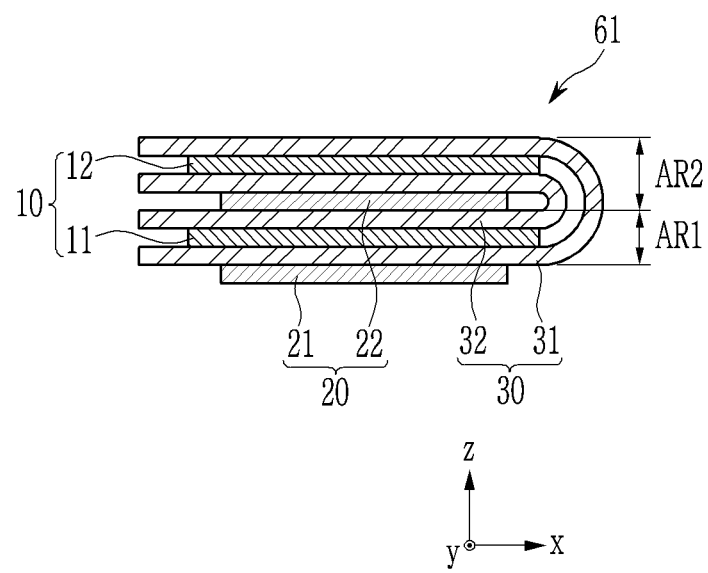
FIG. 3 illustrates a cross-sectional view of the first unit body formed by folding separators in the stacked state shown in FIG. 2.

FIG. 2 is a cross-sectional view illustrating a stacked state before a first unit body is folded; and FIG. 3 illustrates a cross-sectional view of the first unit body formed by folding separators in the stacked state shown in FIG. 2.

Referring to FIG. 2 and FIG. 3, each of the first unit bodies 61 includes a first electrode 10, a second electrode 20, and a separator 30.

In an embodiment, each of the first unit bodies 61 includes first and second separators 31 and 32 of the separator 30, first and second electrode plates 11 and 12 of the first electrode 10, and first and second electrode plates 21 and 22 of the second electrode 20.

Referring to FIG. 2, in the first unit body 61 before being folded, the first electrode plate 11 and the second electrode plate 12 of the first electrode 10 are separately disposed on one side of the first separator 31, and the second separator 32 is disposed to cover the first electrode plate 11 and the second electrode plate 12 of the first electrode 10.

In addition, the first electrode plate 21 of the second electrode 20 is disposed to correspond to the first electrode plate 11 of the first electrode 10, with the first separator 31 interposed therebetween.

The second electrode plate 22 of the second electrode 20 is disposed to correspond to the second electrode plate 12 of the first electrode 10, with the second separator 32 interposed therebetween.

In the present exemplary embodiment, the first electrode 10 serves as a negative electrode, and the second electrode 20 serves as a positive electrode. In an embodiment, a horizontal cross-sectional area (x-y plane area) of the negative electrode is larger than a horizontal cross-sectional area of the positive electrode.

The first unit bodies 61 of FIG. 2 are formed into folded first unit bodies 61 of FIG. 3 by folding the first and second separators 31 and 32 in a counterclockwise direction based on a folding line CL disposed between the first and second electrode plates 11 and 12 of the first electrode 10.

In an embodiment, the first unit body 61 may include a same number of the separators 30, the first electrode 10, and the second electrode 20. FIG. 2 and FIG. 3 exemplarily illustrate a case in which two of each constituent element are included, such as first and second separators 31 and 32 of the separator 30, first and second electrode plates 11 and 12 of the first electrode 10, and first and second electrode plates 21 and 22 of the second electrode 20 included in each of the first unit bodies 61. It will be apparent that, although not illustrated, three or more of each constituent element may be included.

The separator 30 is divided into a first area AR1 and a second area AR2 with reference to the folding line CL. Referring to FIG. 3, in the present exemplary embodiment, the separator 30 includes the first separator 31 disposed outside the folded first unit body 61 and the second separator 32 disposed inside the folded first unit body 61. As a result, the first separator 31 and the second separator 32 may be divided into the first area AR1 and the second area AR2 based on the folding line CL, respectively.

In the folded first unit body 61, the first electrode plate 11 of the first electrode 10 is stacked between the first separator 31 and the second separator 32 and is disposed in the first area AR1. The second electrode plate 12 of the first electrode 10 is also stacked between the first separator 31 and the second separator 32 and is disposed in the second area AR2.

The first electrode plate 21 and the second electrode plate 22 of the second electrode 20 may be disposed to overlap the first electrode plate 11 of the first electrode 10 disposed in the first area AR1 and the second electrode plate 12 of the first electrode 10 disposed in the second area AR2.

In this case, the first electrode plate 21 of the second electrode 20 is disposed to correspond to the first electrode plate 11 of the first electrode 10, with the first separator 31 interposed therebetween, and the second electrode plate 22 of the second electrode 20 is disposed to correspond to the second electrode plate 12 of the first electrode 10, with the second separator 32 interposed therebetween.

The separator 30 separates the first electrode 10 and the second electrode 20 and provides a passage for lithium ions, and any suitable separator may be used, such as a separator commonly used in a lithium secondary battery. In other words, any separator may be used as long as it has a low resistance to ion movement of an electrolyte and an excellent ability to impregnate an electrolyte. The separator 30 may be selected from, for example, glass fiber, polyester, polyethylene, polypropylene, polytetrafluoroethylene, or a combination thereof, and may be a nonwoven fabric or a woven fabric.

Alternatively, for example, a polyolefin-based polymer separator such as polyethylene, polypropylene and the like may be used, and a separator in which a coated layer is formed by coating it with a composition containing a ceramic component or a polymeric substance may be used, and may be optionally used as a single layer or a multi-layer structure, in order to secure heat resistance or mechanical strength.

As illustrated in FIG. 3, the first unit body 61 which is in the folded state may form at least three unit cells by folding the first and second separators 31 and 32, between the first and second electrode plates 11 and 12 of the first electrode 10.

That is, in the second area AR2, the second electrode plate 22 of the second electrode 20, the second separator 32, the second electrode plate 12 of the first electrode 10, and the first separator 31 form one unit cell. In the first region AR1, the first electrode plate 21 of the second electrode 20, the first separator 31, the first electrode plate 11 of the first electrode 10, and the second separator 32 form one unit cell. Between the first area AR1 and the second area AR2, the first electrode plate 11 of the first electrode 10, the second separator 32, and the second electrode plate 22 of the second electrode 20 form one unit cell.

The folded first unit body 61 of a structure illustrated in FIG. 3 is manufactured by stacking the first unit body 61 to have the structure illustrated in FIG. 2, and then folding the first and second separators 31 and 32 in the counterclockwise direction based on the folding line CL, which is a virtual line between the first electrode plate 11 and the second electrode plate 12 of the first electrode 10 which are separately disposed. Since a stacked body of such a structure is manufactured to perform a folding process, alignment of the first electrode 10, the second electrode 20, and the separator 30 may be facilitated during the manufacturing process.

A first sub-unit body 101 is formed by stacking a plurality of first unit bodies 61 of FIG. 3. The first unit bodies 61 stacked in the first sub-unit body 101 are electrically connected to each other through first and second electrode tabs (not illustrated).

Figure 4:
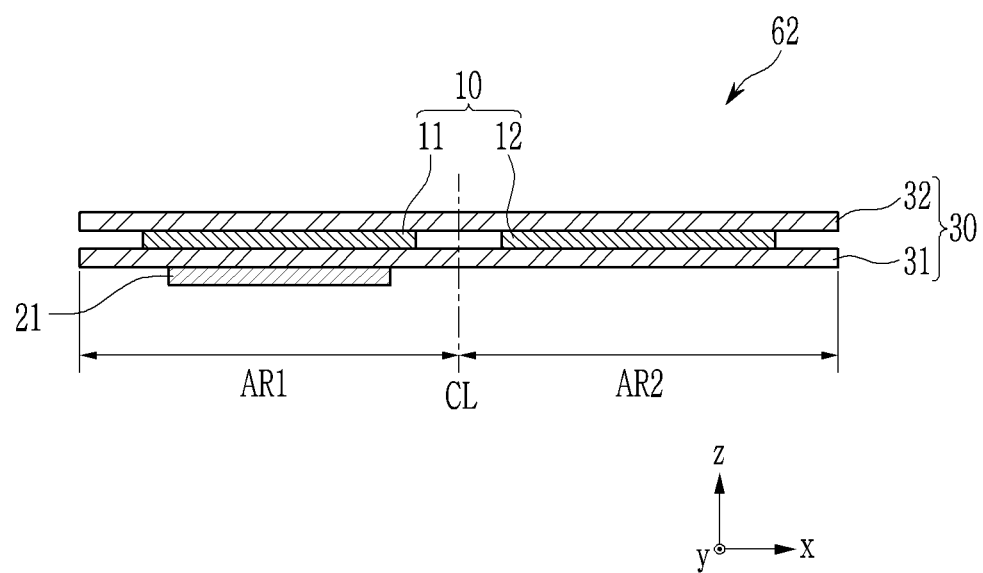
FIG. 4 is a cross-sectional view illustrating a stacked state before a second unit body is folded.
Figure 5:
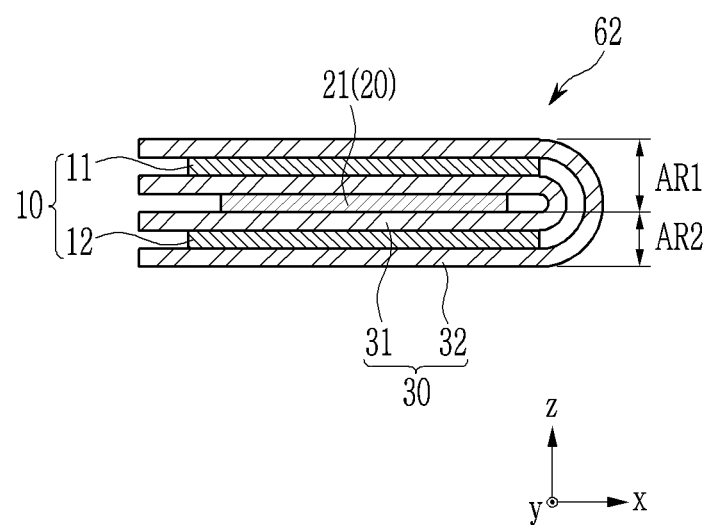
FIG. 5 illustrates a cross-sectional view of the second unit body formed by folding separators in the stacked state shown in FIG. 4.

FIG. 4 is a cross-sectional view illustrating a stacked state before a second unit body is folded; and FIG. 5 illustrates a cross-sectional view of the second unit body formed by folding separators in the stacked state shown in FIG. 4.

Referring to FIG. 4 and FIG. 5, the second unit body 62 has a structure in which the second electrode plate 22 of the second electrode 20 is omitted. Accordingly, the second unit body 62 has a same number of separators 30 as that of the first electrode 10, and the second electrode 20 has a number of electrode plates that is one fewer than that of the first electrode 10 or the separator 30.

The second unit body 62 includes the first and second electrode plates 11 and 12 of the first electrode 10, the first and second separators 31 and 32 of the separator 30, and the first electrode plate 21 of the second electrode 20.

Referring to FIG. 4, in the second unit body 62, the first electrode plate 11 and the second electrode plate 12 of the first electrode 10 are separately disposed on one side of the first separator 31, and the second separator 32 is disposed on the first electrode plate 11 and the second electrode plate 12 of the first electrode 10.

In addition, the first electrode plate 21 of the second electrode 20 is disposed to correspond to the first electrode plate 11 of the first electrode 10, with the first separator 31 interposed therebetween.

The second unit body 62 is formed into the folded second unit body 62 illustrated in FIG. 5 by folding the first and second separators 31 and 32 in the clockwise direction between the first electrode plate 11 and the second electrode plate 12 of the first electrode 10.

The separator 30 of the second unit body 62 is divided into a first area AR1 and a second area AR2 with reference to the folding line CL.

Referring to FIG. 5, in the second unit body 62, the separator 30 includes the second separator 32 disposed outside the folded second unit body 62 and the first separator 31 disposed inside the folded second unit body 62. As a result, the first separator 31 and the second separator 32 may be divided into the first area AR1 and the second area AR2 based on the folding line CL, respectively.

In the folded second unit body 62, the first electrode plate 11 of the first electrode 10 is stacked between the first separator 31 and the second separator 32 and is disposed in the first area AR1.

The second electrode plate 12 of the first electrode 10 is also stacked between the first separator 31 and the second separator 32 and is disposed in the second area AR2.

The first electrode plate 21 of the second electrode 20 may be disposed to overlap with the first electrode plate 11 of the first electrode 10 disposed in the first area AR1.

In the folded second unit body 62, the first electrode plate 21 of the second electrode 20 is disposed between portions of the folded first separator 31, to overlap with the first and second electrode plates 11 and 12 of the first electrode 10.

As illustrated in FIG. 5, the folded second unit body 62 forms one unit cell in the second area AR2 by folding the first and second separators 31 and 32, and further forms one unit cell between the first area AR1 and the second area AR2.

That is, in the first area AR1, the first electrode plate 11 of the first electrode 10, the first separator 31, and the first electrode plate 21 of the second electrode 20 form one unit cell, and, between the first area AR1 and the second area AR2, the second electrode plate 12 of the first electrode 10, the first separator 31, and the first electrode plate 21 of the second electrode 20 form one unit cell.

The second sub-unit body 102 is formed by stacking the first unit bodies 61 of FIG. 3 in a thickness direction (z-axis direction) and disposing the second unit body 62 of FIG. 5 at a lowermost end thereof. Electrical connection is made between the first unit bodies 61 stacked in the second sub-unit body 102, and between the first unit bodies 61 and the second unit body 62, through first and second electrode tabs (not illustrated).

Referring to FIG. 1 again, as described above, since the second unit body 62 is disposed at a lower region of the second sub-unit body 102, electrode plates of the first electrode may be disposed at opposite inner sides of an outermost portion of the electrode assembly 200, thereby improving the safety of the electrode assembly 200.

In addition, in the present exemplary embodiment, a lowermost end of the first sub-unit body 101 is the second electrode and an uppermost end of the second sub-unit body 102 is the first electrode, and, thus, lithium movement is smoothly performed without any barrier at a portion where the first and second sub-unit bodies 101 and 102 are connected to each other.

A number of first unit bodies included in each of the first and second sub-unit bodies 101 and 102, or a total number of the first unit body and the second unit body may be the same or different.

In the present exemplary embodiment, opposite sides of the first sub-unit body 101 may be covered by a first covering material 41a, and opposite sides of the second sub-unit body 102 may be covered by a second covering material 42a, respectively.

In addition, opposite sides of (e.g., the entire outer circumference of) the first sub-unit body 101 and the second sub-unit body 102 stacked in the thickness direction may be covered by a first outer covering material 40a.

In an embodiment, the first covering material 41a, the second covering material 42a, and the first outer covering material 40a may be, for example, a finishing tape.

As such, when the first and second sub-unit bodies 101 and 102 and outer sides (e.g., an entire outer circumference) thereof are covered with the first covering material 41a, the second covering material 42a, and the first outer covering material 40a, a separate process for attaching the first and second sub-unit bodies 101 and 102 may be omitted, thereby improving the productivity.

As described above, in the present disclosure, since the first sub-unit body 101 and the second sub-unit body 102 are stacked in the thickness direction and are electrically connected to each other, an overall capacity of the battery may be easily improved. In addition, since a plurality of sub-unit bodies is included, when defects occur in some of the unit bodies, it is possible to easily reduce the defective ratio by removing or replacing the sub-unit bodies having problems without replacing the entire electrode assembly.

In addition, since the first sub-unit body 101 and the second sub-unit body 102 are directly connected with each other, it is possible to smoothly move lithium ions therebetween, thereby improving the electrical performance of the battery.

Figure 6:
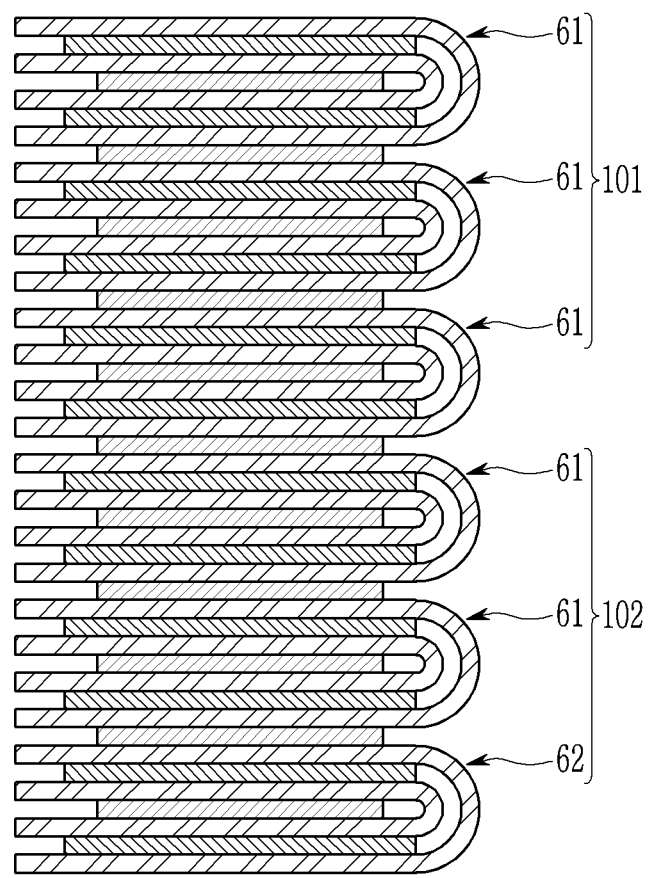
FIG. 6 to FIG. 16 illustrate cross-sectional views of an electrode assembly according to further embodiments, respectively.

FIG. 6 exemplarily illustrates a cross-section of an electrode assembly according to another exemplary embodiment.

The present exemplary embodiment has been modified from the embodiment described with reference to FIG. 1 to FIG. 5 in that it does not include the covering material.

In an embodiment, referring to FIG. 6, the first sub-unit body 101 and the second sub-unit body 102 may be electrically connected to each other by being attached without a separate covering material.

In this case, the first sub-unit body 101 and the second sub-unit body 102 may be attached by, for example, a heat pressing method.

As such, when the first sub-unit body 101 and the second sub-unit body 102 are attached to each other and are electrically connected without such a covering material, it is very advantageous in a post-process such as an electrolyte injection because the electrolyte may be easily impregnated.

The electrode assembly according to the present exemplary embodiment is the same as that of the exemplary embodiment described with reference to FIG. 1 to FIG. 5 except that each of the first and second sub-unit bodies 101 and 102 and opposite side (e.g., an entire outer circumference) thereof are not covered with the first covering material, the second covering material, and the first outer covering material, and, thus, further detailed description of the same constituent elements will be omitted.

Figure 7:
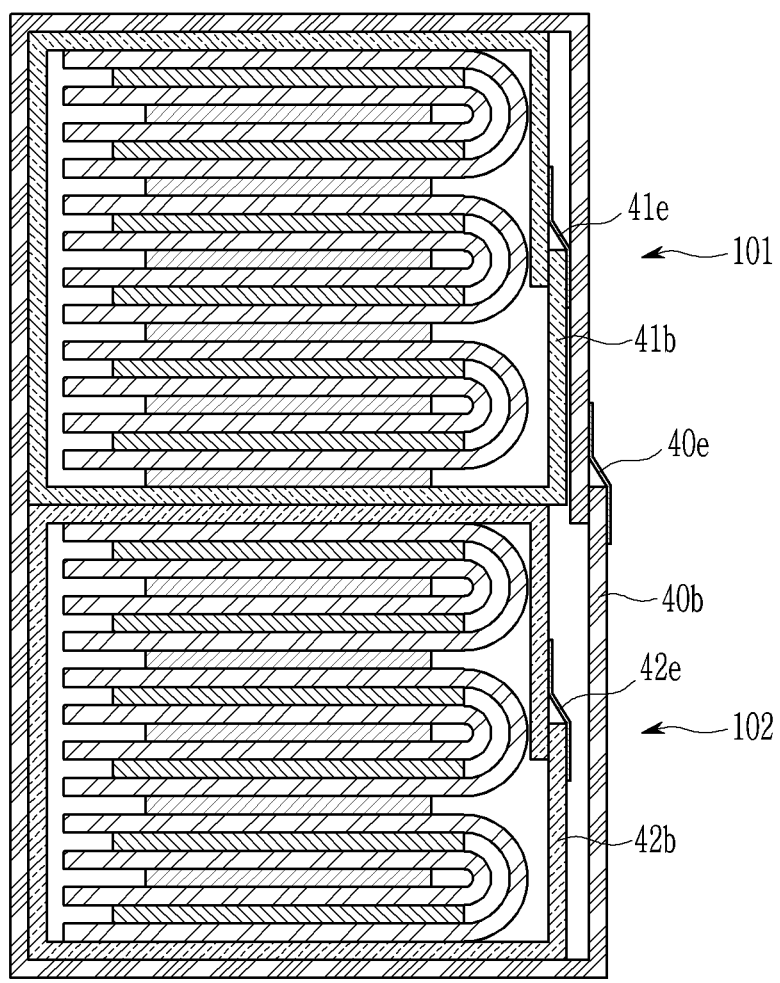

FIG. 7 exemplarily illustrates a cross-section of an electrode assembly according to another exemplary embodiment.

The present exemplary embodiment has been modified from the embodiment described with reference to FIG. 1 to FIG. 5 in the shape of the covering material.

Referring to FIG. 7, the entire outer circumference of the first sub-unit body 101 may be covered by a third cover material 41b and fixed to a finishing tape 41e. The entire outer circumference of the second sub-unit body 102 may be covered by a fourth cover material 42b and fixed to a finishing tape 42e.

The entire outer circumference of the first sub-unit body 101 and the second sub-unit body 102 that are stacked in a thickness direction (z-axis direction) may be covered with a second outer covering material 40b and may be fixed by a finishing tape 40e.

In this case, positions where the respective finishing tapes 41e, 42e, and 40e are fixed may be slightly varied, but they perform a same function in fixing the third cover material 41b, the fourth cover material 42b, and the second outer covering material 40b.

In an embodiment, an electrically insulating covering material may be used, and, for example, a separator may be used as the third covering material 41b, the fourth covering material 42b, and the second outer covering material 40b.

As such, when each outer circumference of the first and second sub-unit bodies 101 and 102 and an entire outer circumference of the first and second sub-unit bodies 101 and 102 which are stacked are covered with the third covering material 41b, the fourth covering material 42b, and the second outer covering material 40b, a separate process for attaching the first and second sub-unit bodies 101 and 102 may be omitted, thereby improving the productivity.

The electrode assembly according to the present exemplary embodiment is the same as that of the exemplary embodiment described with reference to FIG. 1 to FIG. 5 except that each of the first and second sub-unit bodies 101 and 102 and an entire outer circumference thereof are covered with the third covering material, the fourth covering material, and the second outer covering material, and, thus, further detailed description of the same constituent elements will be omitted.

Figure 8:
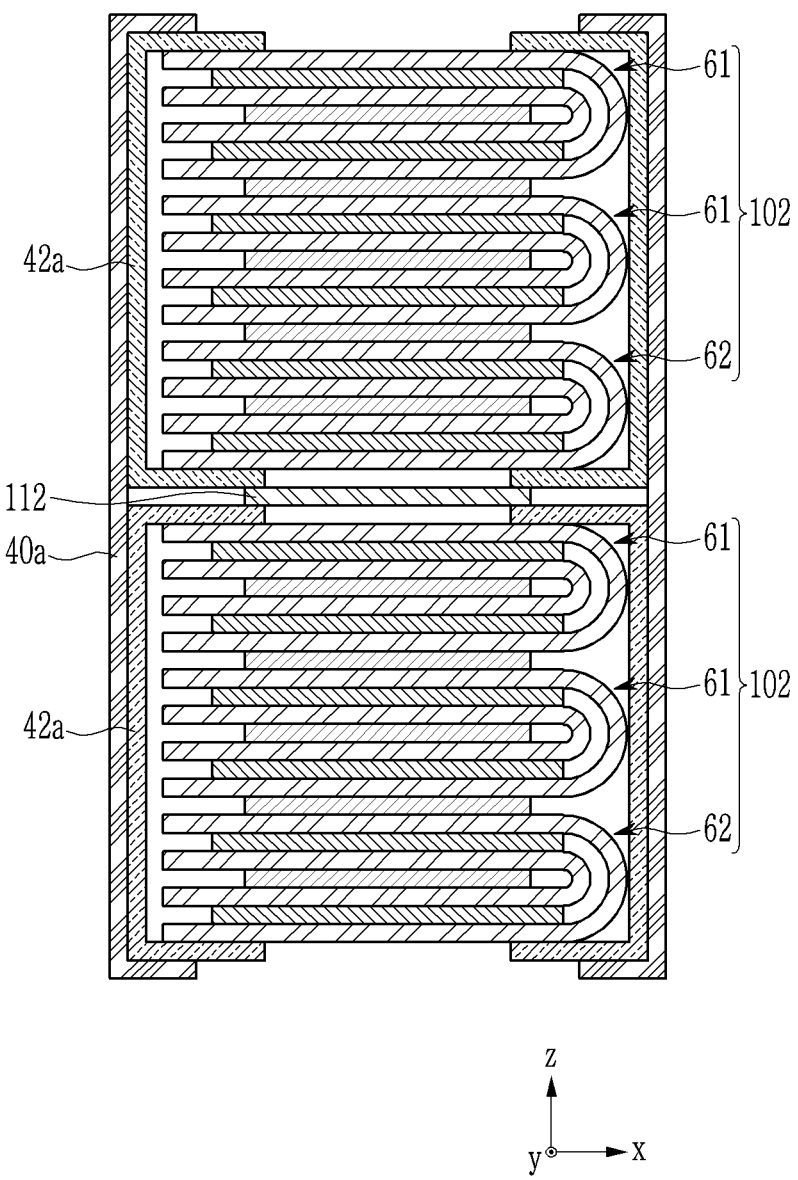

FIG. 8 exemplarily illustrates a cross-section of an electrode assembly according to another exemplary embodiment.

Referring to FIG. 8, an electrode assembly 200 according to another exemplary embodiment includes at least two second sub-unit bodies 102 and includes a connecting electrode 112.

The connecting electrode 112 serves to electrically connect the second sub-unit bodies 102, which are stacked in the thickness direction.

As such, in the present exemplary embodiment, a plurality of second sub-unit bodies 102 are electrically connected to each other using the connecting electrode 112, such that the overall capacity of the battery can be easily improved by a simple structure. In addition, it is possible to smoothly move lithium ions between the second sub-unit bodies 102, thereby improving the electrical performance of the battery.

The second sub-unit body 102 is formed by stacking the first unit bodies 61 of FIG. 3 in a thickness direction (z-axis direction) and disposing the second unit body 62 of FIG. 5 at a lowermost end thereof. Electrical connection is made between the first unit bodies 61 stacked in the second sub-unit body 102, and between the first unit bodies 61 and the second unit body 62, through first and second electrode tabs (not illustrated).

A description related to the first unit bodies 61 and the second unit body 62 may be the same as that described with respect to the embodiment with reference to FIG. 2 to FIG. 5, and will not be further described here.

In the present exemplary embodiment, the first electrode serves as a negative electrode, and the second electrode serves as a positive electrode. In an embodiment, a horizontal cross-sectional area (x-y plane area) of the negative electrode is larger than a horizontal cross-sectional area of the positive electrode. Accordingly, the connection electrode 112 may serve as a positive electrode.

Referring to FIG. 8, the first electrode is disposed at a lowermost end of the second sub-unit body 102 disposed at the upper portion, and the first electrode is also disposed at an upper end of the second sub-unit body 102 located at the lower portion. Accordingly, the second sub-unit bodies 102 may be easily electrically connected by inserting the connecting electrode 112 to electrically connect them. The connecting electrode 112 may be connected to the first electrode of the first unit body 61 and the first electrode of the second unit body 62 through a non-illustrated electrode tab.

A number of the first unit bodies 61 included in the second sub-unit bodies 102 disposed at the upper portion and the lower portion may be the same or different.

In addition, the opposing sides of the second sub-unit body 102 may be covered by the second covering material 42a.

In addition, opposite sides of the second sub-unit bodies 102 stacked in the thickness direction may be covered by the first outer covering material 40a.

In this case, the second covering material 42a and the first outer covering material 40a may be, for example, a finishing tape.

As such, when the second sub-unit bodies 102 and opposite sides (e.g., an entire outer circumference) thereof are covered with the second covering material 42a and the first outer covering material 40a, a separate process for attaching the second sub-unit bodies 102 may be omitted, thereby improving the productivity.

In the present exemplary embodiment, as described above, at least two second sub-unit bodies 102 having a same structure may be stacked in the thickness direction (z-axis direction), and the connecting electrode 112 is disposed therebetween to electrically connect them, thereby easily improving the entire capacity of the battery. In addition, since a plurality of sub-unit bodies are included, when defects occur in some of the unit bodies, it is possible to easily reduce the defective ratio by removing or replacing the sub-unit bodies having problems without replacing the entire electrode assembly.

Figure 9:
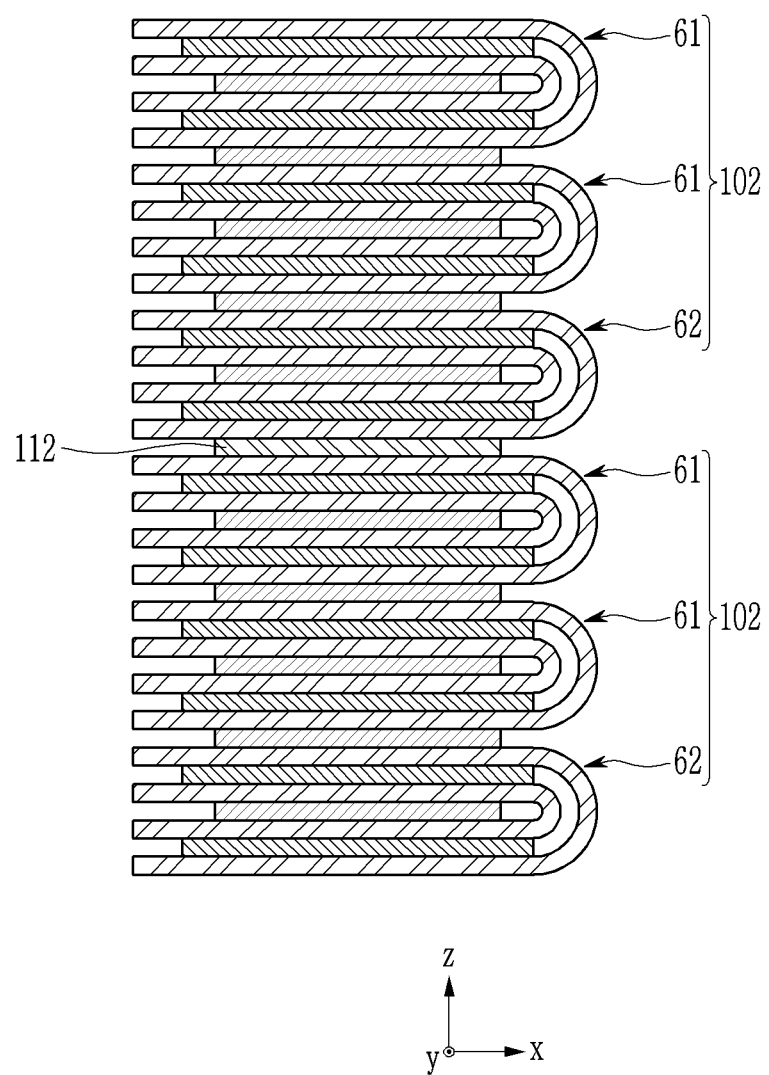

FIG. 9 exemplarily illustrates a cross-section of an electrode assembly according to another exemplary embodiment.

The present exemplary embodiment has been modified from the embodiment described with reference to FIG. 8 in that it does not include the covering material.

Referring to FIG. 9, at least two second sub-unit bodies 102 stacked via the connection electrodes 112 in the thickness direction (z-axis direction) may be attached to each other without a separate covering member.

In this case, at least two second sub-unit bodies 102 may be attached by, for example, a heat pressing method.

As such, when at least two second sub-unit bodies 102 are attached to each other and are electrically connected without such a covering material, it is very advantageous in a post-process such as an electrolyte injection because the electrolyte may be easily impregnated.

The electrode assembly according to the present exemplary embodiment is the same as that of the exemplary embodiment described with reference to FIG. 8 except that each of the second sub-unit bodies 102 and outer sides (e.g., an entire outer circumference) thereof are not covered with the second covering material and the first outer covering material, and, thus, further detailed description of the same constituent elements will be omitted.

Figure 10:
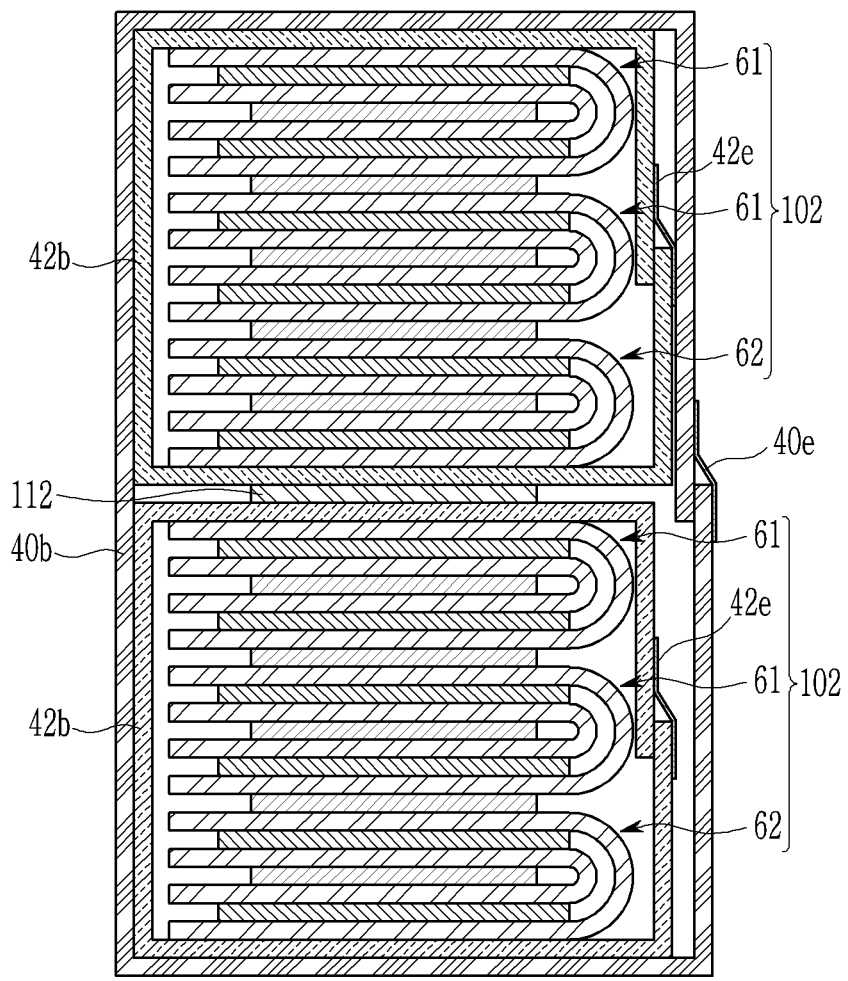

FIG. 10 exemplarily illustrates a cross-section of an electrode assembly according to another exemplary embodiment.

The present exemplary embodiment has been modified from the embodiment described with reference to FIG. 8 in the shape of the covering material.

Referring to FIG. 10, the entire outer circumference of each of the second sub-unit bodies 102 may be covered by the fourth cover material 42b and fixed to the finishing tape 42e.

The entire outer circumference of at least two second sub-unit bodies 102 that are stacked in the thickness direction may be covered with the second outer covering material 40b and may be fixed by the finishing tape 40e.

In this case, positions of the respective finishing tapes 42e and 40e may be slightly varied, but they perform a same function in fixing the fourth cover material 42b, and the second outer covering material 40b.

In an embodiment, an electrically insulating covering material may be used, and, for example, a separator may be used as the fourth covering material 42b and the second outer covering material 40b.

As such, when an outer circumference of the second sub-unit bodies 102 and an entire outer circumference of at least two second sub-unit bodies 102 which are stacked are covered with the fourth covering material 42b and the second outer covering material 40b, a separate process for attaching each of the second sub-unit bodies 102 may be omitted, thereby improving the productivity.

The electrode assembly according to the present exemplary embodiment is the same as that of the exemplary embodiment described with reference to FIG. 8 except that each of the second sub-unit bodies 102 and an entire outer circumference thereof are covered with the fourth covering material and the second outer covering material, and, thus, further detailed description of the same constituent elements will be omitted.

Figure 11:
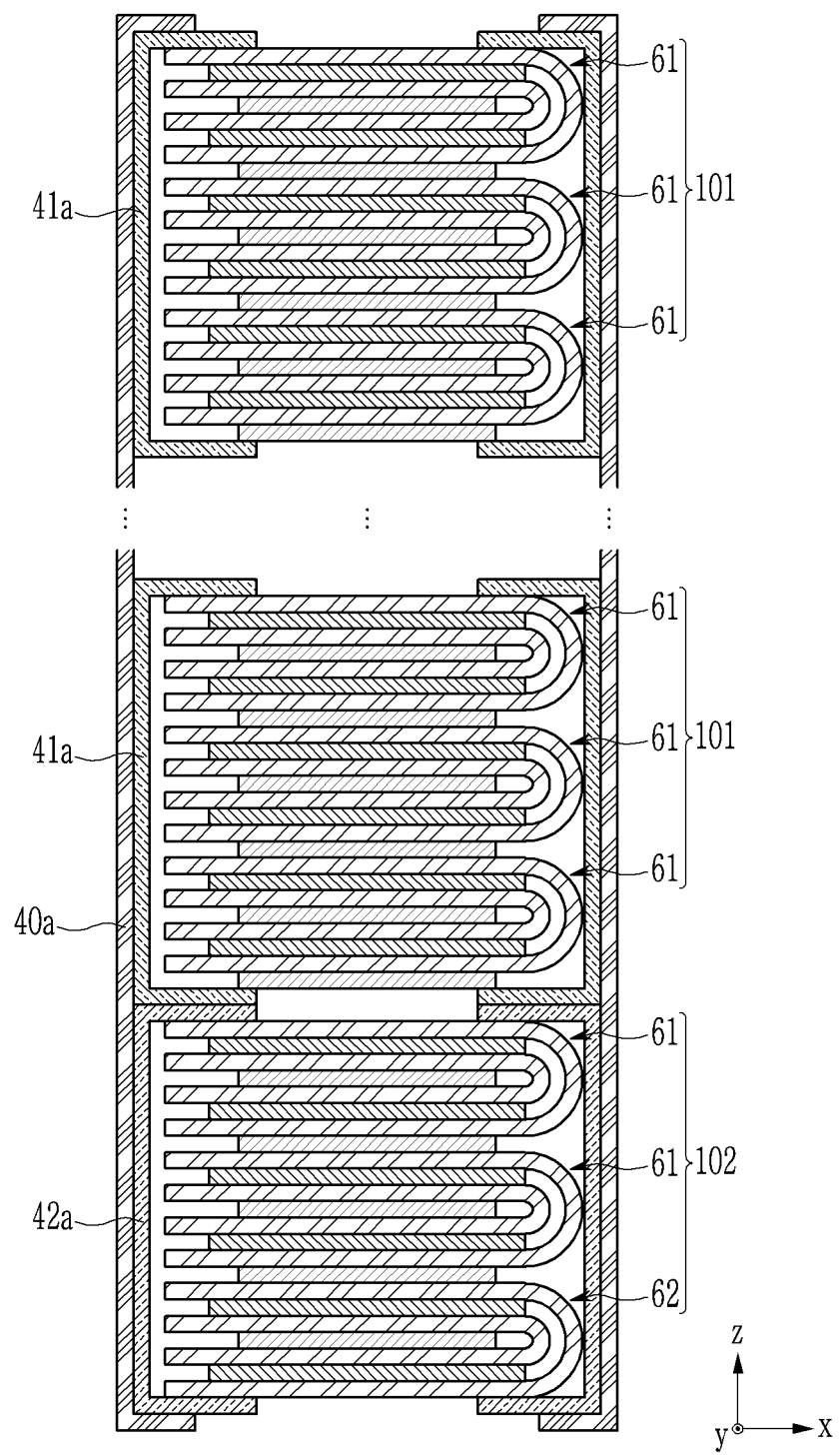

FIG. 11 exemplarily illustrates a cross-section of an electrode assembly according to another exemplary embodiment.

The present exemplary embodiment has been modified from the embodiment described with reference to FIG. 1 to FIG. 5 in the number of the first sub-unit bodies 101.

Referring to FIG. 11, in the present exemplary embodiment, at least two first sub-unit bodies 101 stacked in the thickness direction (z-axis direction) are included, and the second sub-unit body 102 disposed at a lower portion of the first sub-unit body 101 disposed at a lowermost portion is included.

In an embodiment, seven to twenty-five first sub-unit bodies 101 may be stacked in the thickness direction z.

As such, the first unit bodies 61 may be stacked to constitute a first sub-unit body 101 and then a plurality of first sub-unit bodies 101 may be stacked, thereby facilitating the manufacturing process of the first sub-unit bodies 101 and an increase in the capacity of the battery.

The electrode assembly 200 according to the present exemplary embodiment is the same as that of the exemplary embodiment described with reference to FIG. 1 to FIG. 5 except that the electrode assembly 200 is configured by stacking at least two first sub-unit bodies 101 and then disposing the second sub-unit body 102 at a lower portion thereof, and, thus, further detailed description of the same constituent elements will be omitted.

Figure 12:
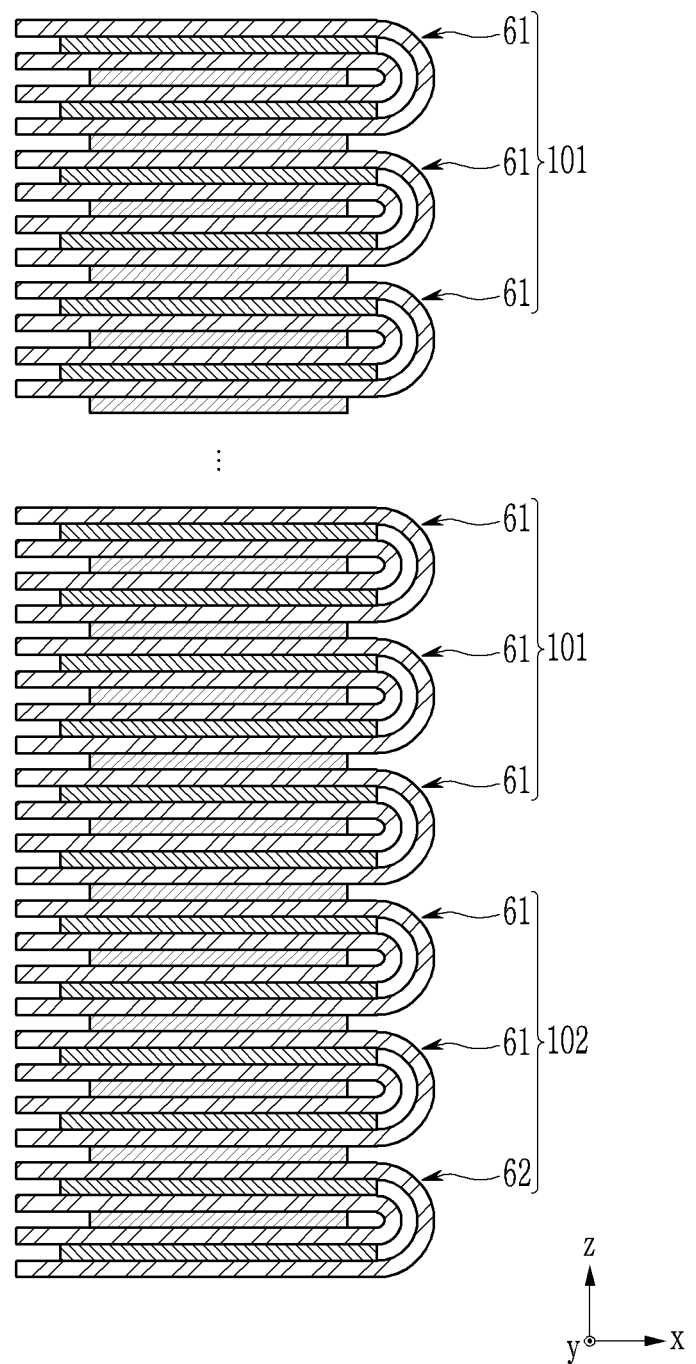

FIG. 12 exemplarily illustrates a cross-section of an electrode assembly according to another exemplary embodiment.

The present exemplary embodiment has been modified from the embodiment described with reference to FIG. 1 to FIG. 5 in the number of the first sub-unit bodies 101 and in that no covering material is included.

Referring to FIG. 12, in the present exemplary embodiment, at least two first sub-unit bodies 101 stacked in the thickness direction (z-axis direction) are included, and the second sub-unit body 102 disposed at a lower portion of the first sub-unit body 101 disposed at a lowermost portion is included.

In an embodiment, seven to twenty-five first sub-unit bodies 101 may be stacked in the thickness direction.

As such, the first unit bodies 61 may be stacked to constitute a first sub-unit body 101 and then a plurality of first sub-unit bodies 101 may be stacked, thereby facilitating the manufacturing process of the first sub-unit bodies 101 and an increase in the capacity of the battery.

In addition, at least two first sub-unit bodies 101 and the second sub-unit body 102 may be electrically connected to each other by being attached without a separate covering material.

In this case, the first sub-unit body 101 and the second sub-unit body 102 may be attached by, for example, a heat pressing method.

As such, when the first sub-unit body 101 and the second sub-unit body 102 are attached to each other and are electrically connected without such a covering material, it is very advantageous in a post-process, such as electrolyte injection, because the electrolyte may be easily impregnated.

Figure 13:
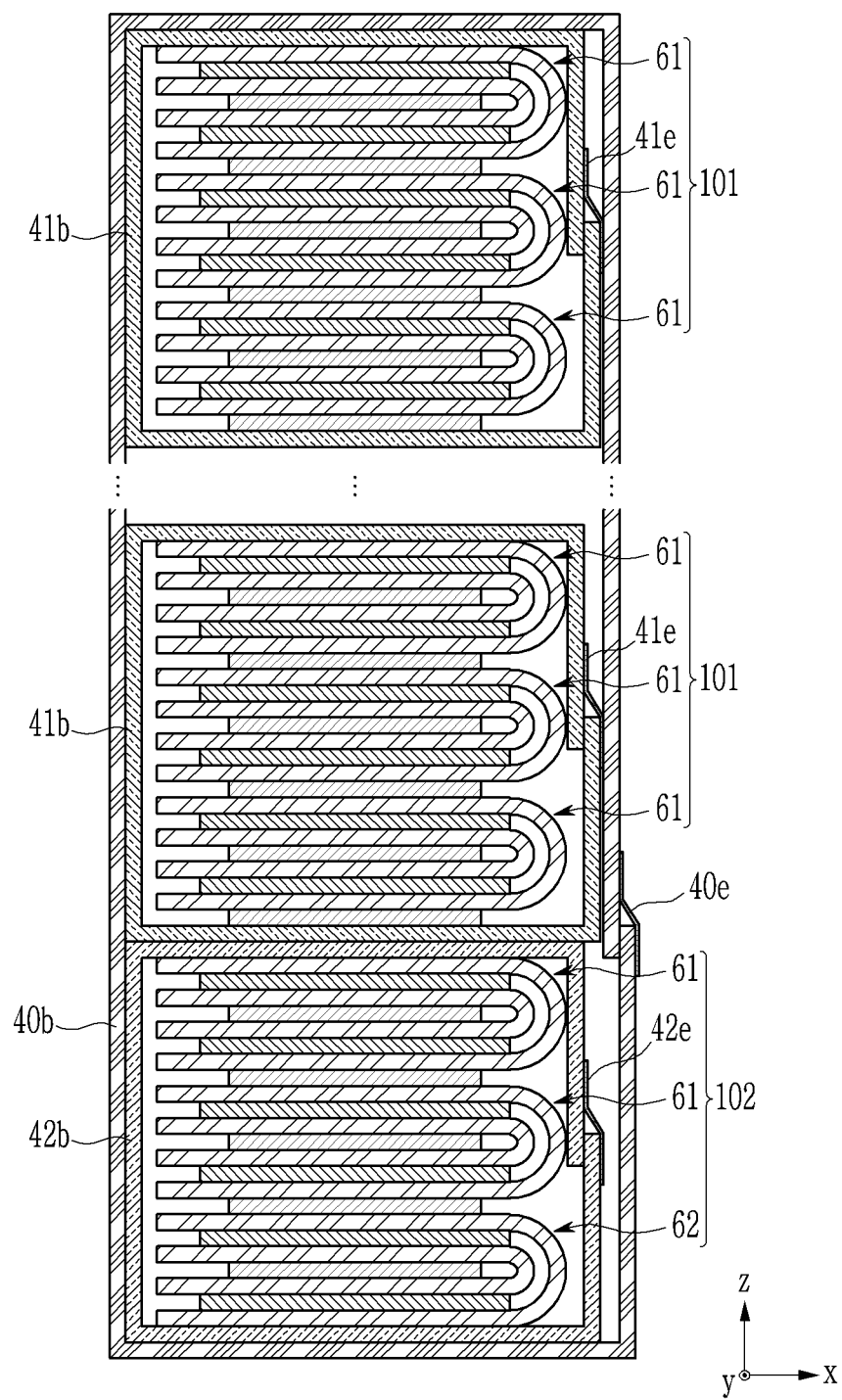

FIG. 13 exemplarily illustrates a cross-section of an electrode assembly according to another exemplary embodiment.

The present exemplary embodiment has been modified from the embodiment described with reference to FIG. 1 to FIG. 5 in the number of the first sub-unit bodies 101 and the shape of the covering material.

Referring to FIG. 13, in the present exemplary embodiment, at least two first sub-unit bodies 101 stacked in the thickness direction (z-axis direction) are included, and the second sub-unit body 102 disposed at a lower portion of the first sub-unit body 101 disposed at a lowermost portion is included.

In an embodiment, seven to twenty-five first sub-unit bodies 101 may be stacked in the thickness direction.

As such, the first unit bodies 61 may be stacked to constitute a first sub-unit body 101 and then a plurality of first sub-unit bodies 101 may be stacked, thereby facilitating the manufacturing process of the first sub-unit bodies 101 and an increase in the capacity of the battery.

The entire outer circumference of each of the first sub-unit bodies 101 may be covered by the third cover material 41b and fixed to the finishing tape 41e. The entire outer circumference of the second sub-unit body 102 may be covered by the fourth cover material 42b and fixed to the finishing tape 42e.

The entire outer circumference including at least two first sub-unit bodies 101 and the second sub-unit body 102 that are stacked in the thickness direction may be covered with a second outer covering material 40b and may be fixed by the finishing tape 40e.

In this case, positions where the respective finishing tapes 41e, 42e, and 40e are fixed may be slightly varied, but they perform a same function in fixing the third cover material 41b, the fourth cover material 42b, and the second outer covering material 40b.

In an embodiment, an electrically insulating covering material may be used, and, for example, a separator may be used as the third covering material 41b, the fourth covering material 42b, and the second outer covering material 40b.

As such, when each outer circumference of the first and second sub-unit bodies 101 and 102 and an entire outer circumference of the first sub-unit bodies 101 and the second sub-unit body 102 which are stacked are covered with the third covering material 41b, the fourth covering material 42b and the second outer covering material 40b, a separate process for attaching each of the sub-unit bodies may be omitted, thereby improving the productivity.

The constituent elements of the electrode assembly according to the exemplary embodiments described with reference to FIG. 11 to FIG. 13 may be the same as those of the electrode assembly according to each of the exemplary embodiment described with reference to FIG. 1 to FIG. 5, the exemplary embodiment described with reference to FIG. 6, and the exemplary embodiment described with reference to FIG. 7, except including the plurality of first sub-unit bodies.

Figure 14:
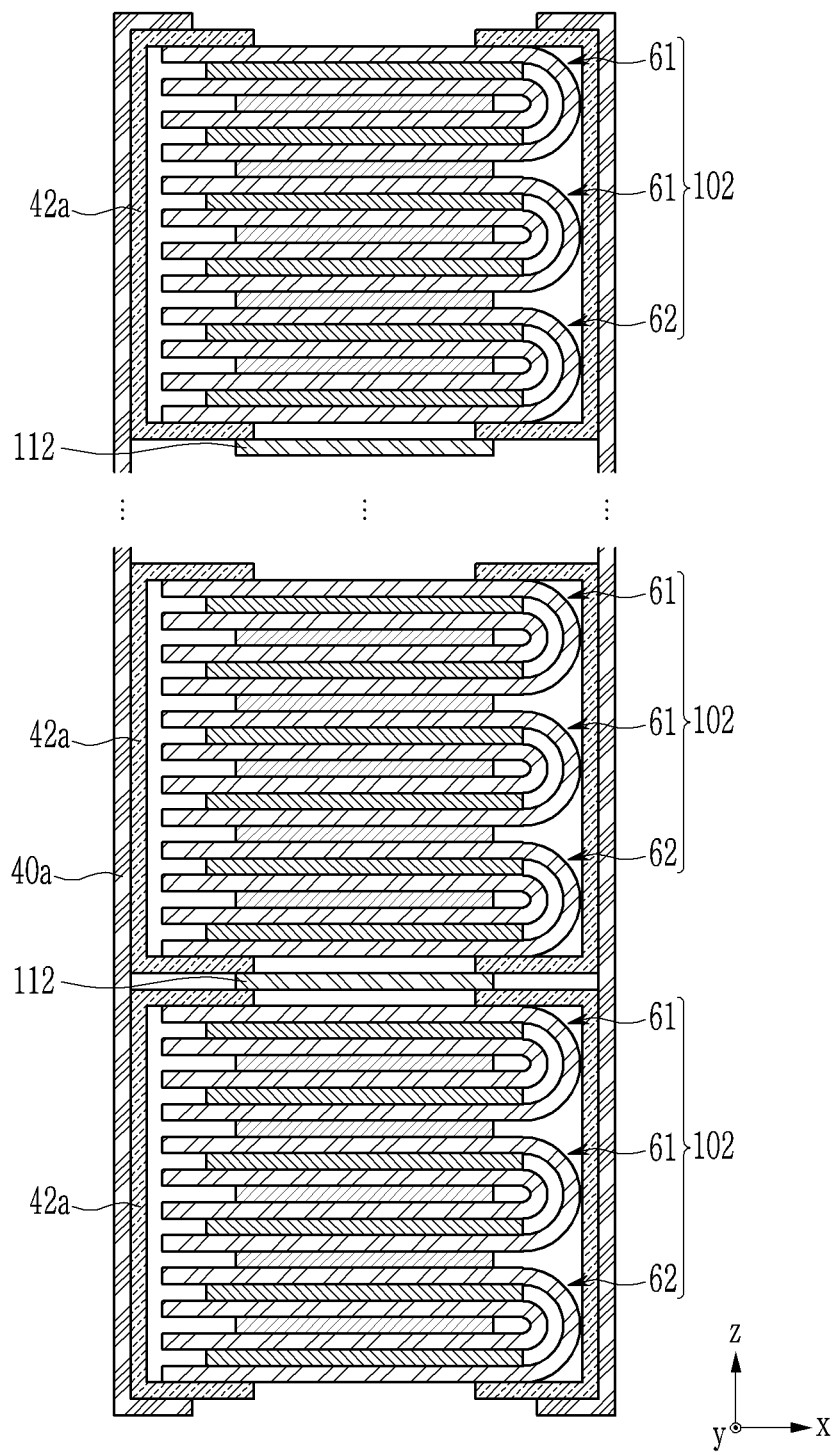

FIG. 14 exemplarily illustrates a cross-section of an electrode assembly according to another exemplary embodiment.

The present exemplary embodiment has been modified from the embodiment described with reference to FIG. 8 in the number of the second sub-unit bodies 102.

Referring to FIG. 14, in the present exemplary embodiment, at least three second sub-unit bodies 102 stacked in the thickness direction (z-axis direction) are included and a connecting electrode for electrically connecting the respective second sub-unit body 102 is included.

In an embodiment, seven to twenty-five second sub-unit bodies 102 may be stacked in the thickness direction.

As such, the first unit bodies 61 may be stacked and the second unit body 62 may be disposed at a lower portion of the first unit body 61 disposed at a lowermost portion to constitute a second sub-unit body 102 and then a plurality of second sub-unit bodies 102 may be stacked, thereby facilitating the manufacturing process of the first sub-unit bodies 102 and an increase in the capacity of the battery.

The electrode assembly according to the present exemplary embodiment may be the same as that of the exemplary embodiment described with reference to FIG. 8 except that at least three second sub-unit bodies 102 are stacked in the thickness direction, and, thus, further detailed description of the same constituent elements will be omitted.

Figure 15:
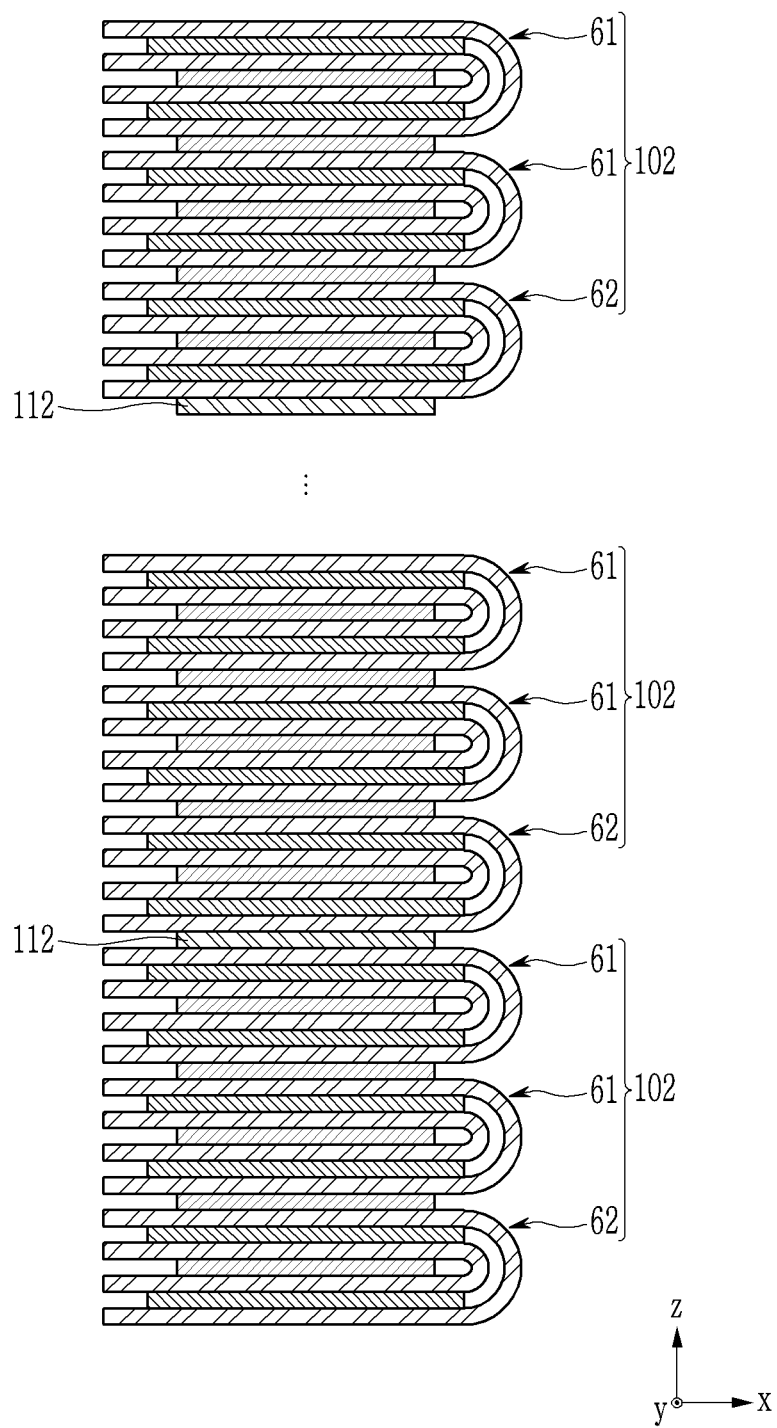

FIG. 15 exemplarily illustrates a cross-section of an electrode assembly according to another exemplary embodiment.

The present exemplary embodiment has been modified from the embodiment described with reference to FIG. 8 in the number of the second sub-unit bodies 102 and in that no covering material is included.

Referring to FIG. 15, in the present exemplary embodiment, at least three second sub-unit bodies 102 stacked in the thickness direction (z-axis direction) are included and a connecting electrode for electrically connecting the respective second sub-unit body 102 is included.

In an embodiment, seven to twenty-five second sub-unit bodies 102 may be stacked in the thickness direction.

As such, the first unit bodies 61 may be stacked and the second unit body 62 may be disposed at a lower portion of the first unit body 61 disposed at a lowermost portion to constitute a second sub-unit body 102 and then a plurality of second sub-unit bodies 102 may be stacked, thereby facilitating the manufacturing process of the second sub-unit bodies 102 and an increase in the capacity of the battery.

In addition, at least three second sub-unit bodies 102 stacked via the connection electrodes 112 in the thickness direction (z-axis direction) may be attached to each other without a separate covering member.

In this case, at least three second sub-unit bodies 102 may be attached by, for example, a heat pressing method.

As such, when at least three second sub-unit bodies 102 are attached to each other and are electrically connected without such a covering material, it is very advantageous in a post-process, such as electrolyte injection, because the electrolyte may be easily impregnated.

Figure 16:
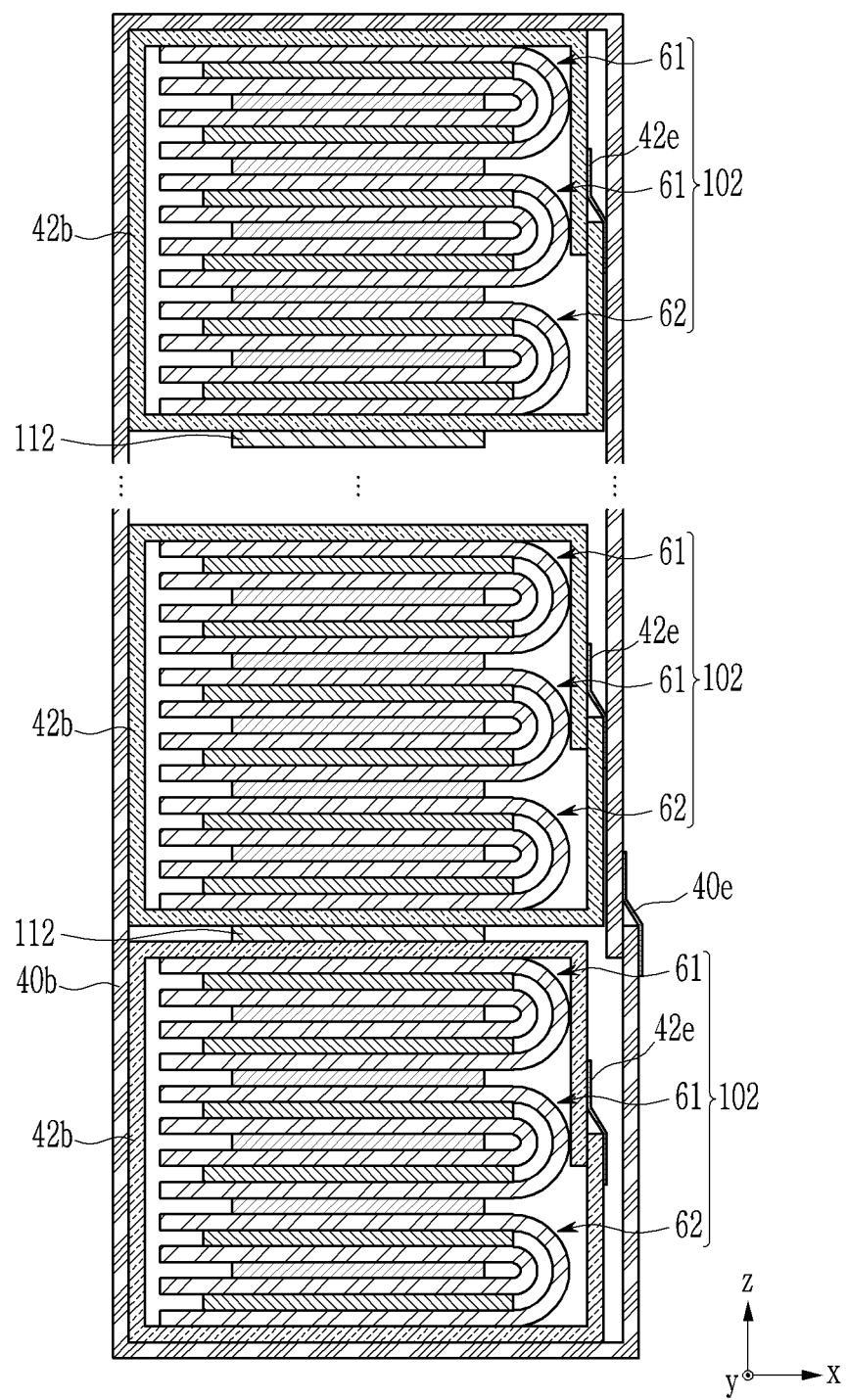

FIG. 16 exemplarily illustrates a cross-section of an electrode assembly according to another exemplary embodiment.

The present exemplary embodiment has been modified from the embodiment described with reference to FIG. 8 in the number of the second sub-unit bodies 102 and the shape of the covering material.

Referring to FIG. 16, in the present exemplary embodiment, at least three second sub-unit bodies 102 stacked in the thickness direction (z-axis direction) are included and a connecting electrode for electrically connecting the respective second sub-unit body 102 is included.

In an embodiment, seven to twenty-five second sub-unit bodies 102 may be stacked in the thickness direction.

As such, the first unit bodies 61 may be stacked and the second unit body 62 may be disposed at a lower portion of the first unit body 61 disposed at a lowermost portion to constitute a second sub-unit body 102 and then a plurality of second sub-unit bodies 102 may be stacked, thereby facilitating the manufacturing process of the second sub-unit bodies 102 and an increase in the capacity of the battery.

In an embodiment, the entire outer circumference of the second sub-unit bodies 102 may be covered by the fourth cover material 42*b* and fixed to the finishing tape 42*e*.

In an embodiment, the entire outer circumference of at least three second sub-unit bodies 102 that are stacked in the thickness direction may be covered with the second outer covering material 40*b* and may be fixed by the finishing tape 40*e*.

In this case, positions where the respective finishing tapes 42*e* and 40*e* may be slightly varied, but they perform a same function in fixing the fourth cover material 42*b* and the second outer covering material 40*b*.

In an embodiment, an electrically insulating covering material may be used, and, for example, a separator may be used as the fourth covering material 42*b* and the second outer covering material 40*b*.

As such, when an outer circumference of each of the second sub-unit bodies 102 and an entire outer circumference of at least three second sub-unit bodies 102 which are stacked are covered with the fourth covering material 42*b* and the second outer covering material 40*b*, a separate process for attaching each of the second sub-unit bodies 102 may be omitted, thereby improving the productivity.

The constituent elements of the electrode assembly according to the exemplary embodiments described with reference to FIG. 14 to FIG. 16 may be the same as those of the electrode assembly according to each of the exemplary embodiment described with reference to FIG. 8, the exemplary embodiment described with reference to FIG. 9, and the exemplary embodiment described with reference to FIG. 10, except including at least three second sub-unit bodies.

While this invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly comprising:
   at least one first sub-unit body comprising a plurality of stacked first unit bodies; and
   a second sub-unit body at a lower portion of the at least one first sub-unit body and comprising a plurality of stacked first unit bodies and a second unit body at a lower portion of the stacked first unit bodies,
   wherein each of the first unit bodies comprises:
   a first electrode plate and a second electrode plate of a first electrode separately arranged at a side of a first separator;
   a second separator on the first electrode plate and the second electrode plate of the first electrode;
   a first electrode plate of a second electrode arranged to correspond to the first electrode plate of the first electrode, with the first separator therebetween; and
   a second electrode plate of the second electrode arranged to correspond to the second electrode plate of the first electrode, with the second separator therebetween,
   the first separator and the second separator are folded with respect to a folding line located between the first electrode plate and the second electrode plate of the first electrode, the second unit body comprises the first unit body from which the second electrode plate of the second electrode is removed and which is folded, wherein opposite sides of the at least one first sub-unit body are covered by a first covering material, and opposite sides of the second sub-unit body are covered by a second covering material, and a lowermost one of the first unit bodies of the at least one first sub-unit body is spaced apart from an uppermost one of the first unit bodies of the second sub-unit body along a stacking direction of the at least one first sub-unit body and the second sub-unit body, and the lowermost one of the first unit bodies of the at least one first sub-unit body is exposed to the uppermost one of the first unit bodies of the second sub-unit body along the stacking direction through openings of the first and second covering materials.

2. The electrode assembly of claim 1, wherein the second unit body comprises:

a first electrode plate and a second electrode plate of a first electrode of the second unit body separately arranged at a side of a first separator of the second unit body;

a second separator on the first electrode plate and the second electrode plate of the first electrode of the second unit body; and a first electrode plate of a second electrode of the second unit body arranged to correspond to the first electrode plate of the first electrode of the second unit body, with the first separator of the second unit body therebetween, wherein the first separator of the second unit body and the second separator of the second unit body are folded with respect to a folding line of the second unit body located between the first electrode plate and the second electrode plate of the first electrode of the second unit body.

3. The electrode assembly of claim 1, wherein opposite sides of the at least one first sub-unit body and the second sub-unit body are covered by a first outer covering material.

4. The electrode assembly of claim 1, wherein the first electrode is a negative electrode, and the second electrode is a positive electrode.

5. The electrode assembly of claim 4, wherein a horizontal cross-section of the negative electrode is larger than a horizontal cross-section of the positive electrode.

6. The electrode assembly of claim 1, wherein the at least one first sub-unit body comprises seven to twenty-five first sub-unit bodies stacked in a thickness direction.

* * * * *